United States Patent
Wu et al.

(10) Patent No.: US 10,389,474 B1
(45) Date of Patent: Aug. 20, 2019

(54) DYNAMIC RECEIVER TUNING OF WIDEBAND ANTI-JAM MODEMS

(71) Applicant: ARCHITECTURE TECHNOLOGY, INC., Eden Prairie, MN (US)

(72) Inventors: John Wu, Eden Prairie, MN (US); Nathan E. Bahr, Eden Prairie, MN (US); Ranga S. Ramanujan, Medina, MN (US)

( * ) Notice: Subject to any disclaimer, the term of this patent is extended or adjusted under 35 U.S.C. 154(b) by 0 days.

(21) Appl. No.: 16/249,331

(22) Filed: Jan. 16, 2019

Related U.S. Application Data

(60) Provisional application No. 62/791,372, filed on Jan. 11, 2019.

(51) Int. Cl.
| | | |
|---|---|---|
| H04B 1/18 | (2006.01) | |
| H04B 7/185 | (2006.01) | |
| H04K 3/00 | (2006.01) | |
| H04B 1/10 | (2006.01) | |
| H04B 1/7097 | (2011.01) | |

(52) U.S. Cl.
CPC ............... H04K 3/20 (2013.01); H04B 1/10 (2013.01); H04B 1/7097 (2013.01)

(58) Field of Classification Search
CPC .. H04B 1/69; H04B 1/713; H04B 2001/6912; H04B 2001/7154; H04K 3/226; H04K 3/25; H04K 2204/36; H04W 12/08; H04W 72/12; H04W 72/046
USPC ............ 455/12.1, 185.1, 410, 414.1, 427; 375/130, 132, 140, 141, 144; 370/315, 370/316
See application file for complete search history.

(56) References Cited

U.S. PATENT DOCUMENTS

| | | | | | |
|---|---|---|---|---|---|
| 6,141,371 | A  * | 10/2000 | Holmes | ................... | G01S 19/21 375/130 |
| 7,289,460 | B1 * | 10/2007 | Thacker | ............. | H04B 7/18543 370/320 |
| 7,852,855 | B1 * | 12/2010 | Gooding | ............ | H04B 7/18584 455/427 |
| 8,548,377 | B2 * | 10/2013 | Dankberg | .......... | H04B 7/18543 455/12.1 |
| 9,485,063 | B2 * | 11/2016 | Shattil | ................... | H04B 7/026 |

OTHER PUBLICATIONS

Wu, et al., "ADNS IPv6 Transition Architecture and Analysis" IEEE MILCOM 2014, pp. 1-6, Oct. 2014, USA.

* cited by examiner

*Primary Examiner* — Quochien B Vuong
(74) *Attorney, Agent, or Firm* — Carlson, Caspers, Vandenburgh & Lindquist, P.A.

(57) ABSTRACT

Embodiments for a method of dynamically tuning receivers of a wideband anti-jam modem (WAM) are provided. The method includes cyclically tuning one or more receivers through a plurality of channels except a first channel. The method also includes receiving an indication, while cyclically tuning, that one or more packets to an endpoint device behind a first WAM are to be sent to the first WAM on a second channel of the plurality of channels. In response to receiving the indication, the cyclical tuning for a first receiver of the plurality of receivers is halted and the first receiver is tuned to the second channel for a first period of time to receive the one or more messages. After the first period of time, cyclically tuning the first receiver along with any other receivers of the one or more receivers through the plurality of channels except the first channel.

20 Claims, 6 Drawing Sheets

DYNAMIC RECEIVER TUNING OF WIDEBAND ANTI-JAM MODEMS

RELATED APPLICATIONS

This application claims the benefit of U.S. Provisional Application No. 62/791,372 filed on Jan. 11, 2019, entitled "DYNAMIC RECEIVER TUNING OF WIDEBAND ANTI-JAM MODEM", which is hereby incorporated herein by reference.

GOVERNMENT CONTRACTS

This invention was made with government support under contract N68335-18-C-0213 awarded by the Navy. The government may have certain rights in the invention.

BACKGROUND

There is a desire to use wideband anti-jam modems (WAMs) by the United States Navy for communication between vessels and/or land stations over satellite communication (SATCOM) links. The desired WAMs would be able to send and receive signals between one another via a satellite in accordance with a WAM direct sequence spread spectrum (DSSS) mode specification (e.g., version 0.8 or version 2.0) promulgated by the United States Navy. Such WAMs will enable communication between navy vessels and the mainland but will need to be efficiently integrated into the existing Navy networks.

BRIEF DESCRIPTION

Embodiments for a method of dynamically tuning receivers of a wideband anti-jam modem (WAM) are provided. There are a plurality of channels for transmission and reception of signals for a plurality of WAMs. A first WAM of the plurality of WAMs includes one or more receivers and a transmitter. Each of the one or more receivers is tunable to receive a single channel of the plurality of channels at a time, and the transmitter is fixed to transmit on a first channel of the plurality of channels. The plurality of channels includes more channels than there are receivers in the one or more receivers. The method of dynamically tuning receivers includes cyclically tuning the one or more receivers through the plurality of channels except the first channel. The method also includes receiving an indication that one or more packets to an endpoint device behind the first WAM are to be sent to the first WAM on a second channel of the plurality of channels, while cyclically tuning the one or more receivers. In response to receiving the indication, the cyclical tuning for a first receiver of the plurality of receivers is halted and the first receiver is tuned to the second channel for a first period of time to receive the one or more messages. After the first period of time, cyclically tuning the first receiver along with any other receivers of the one or more receivers through the plurality of channels except the first channel.

Embodiments for a method of dynamically tuning receivers among a plurality of wideband anti-jam modems (WAM) are also provided. There are a plurality of channels for transmission and reception of signals for a plurality of WAMs. Each of the plurality of WAMs has one or more receivers and a transmitter, and each of the one or more receivers is tunable to receive a single channel of the plurality of channels at a time. The transmitter of each of the plurality of WAMs is fixed to transmit on a single channel of the plurality of channels. In particular, each WAM's transmitter is fixed to transmit on a different single channel than each other WAM's transmitter. The plurality of channels includes more channels than there are receivers in the one or more receivers of any single WAM of the plurality of WAMs. The method includes cyclically tuning the one or more receivers of each WAM through the plurality of channels except the single channel to which the transmitter of that WAM is fixed. Each WAM of the plurality of WAMS transmits a channel request message over the single channel to which that WAM's transmitter is fixed in response to receiving an indication that one or more packets from an endpoint device behind that WAM are to be transmitted from that WAM. While cyclically tuning the one or more receivers, each WAM of the plurality of WAMs listens for indications on the plurality of channels that one or more packets are to be sent to an endpoint device behind that WAM on a respective channel of the plurality of channels. In response to an indication that one or more packets are to be sent to an endpoint device behind that WAM, each WAM of the plurality of WAMs assigns a respective receiver of the WAM to the respective channel over which the one or more packets are to be sent for a period of time to receive the one or more packets. Assigning a respective receiver includes halting cyclical tuning for the respective receiver and tuning the respective receiver to the respective channel. Cyclically tuning includes each WAM of the plurality of WAMs cyclically tuning receivers of the one or more receivers while those receivers are not assigned to a channel.

Embodiments for a program product are also provided. The program product is for a wideband anti-jam modem (WAM) including one or more receivers and a transmitter on a first WAM of a plurality of WAMs. There are a plurality of channels for transmission and reception of signals for a plurality of WAMs. Each of the one or more receivers of the WAM is tunable to receive a single channel of the plurality of channels at a time. The transmitter of the WAM is fixed to transmit on a first channel of the plurality of channels. The plurality of channels includes more channels than there are receivers in the one or more receivers. The program product includes: a non-transitory processor readable medium having software stored thereon. The software, when executed by one or more processing devices of a WAM, is configured to cyclically tune the one or more receivers through the plurality of channels except the first channel. The software is also configured to receive an indication, while cyclically tuning the one or more receivers, that one or more packets to an endpoint device behind the first WAM are to be sent to the first WAM on a second channel of the plurality of channels. In response to receiving the indication, the software is configured to halt the cyclical tuning for a first receiver of the plurality of receivers and tuning the first receiver to the second channel for a first period of time to receive the one or more messages. After the first period of time, the software is configured to cyclically tune the first receiver along with any other receivers of the one or more receivers through the plurality of channels except the first channel.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

The proposed wideband anti-jam modems (WAMs) would each include a single transmitter and a plurality of receivers. The proposed systems separate the WAMs into distinct groups referred to as communities-of-interest (COIs). Each COI consists of a certain number of channels and includes a number of WAMs less than or equal to that number of channels. Each WAM of the COI is assigned a different one of the channels of the COI and the transmitter of that WAM is set to transmit on the assigned channel at all times. The number of channels of the COI is chosen to correspond to the number of receivers of each WAM. In these prior systems, each WAM has 48 receivers, and so each COI includes 49 channels. Since each WAM is set to transmit on a distinct one of the 49 channels, up to 49 WAMs can be included in a single COI. Each of the 48 receivers of a WAM is set to receive on a different one of the remaining 48 channels, excluding the one channel that the transmitter for that WAM is set to transmit on. Thus, each WAM transmits on one of the 49 channels and receives on each of the remaining 48 channels. With each WAM set-up in this way, all WAMs in a COI can communicate with one another at all times.

Figure 1:
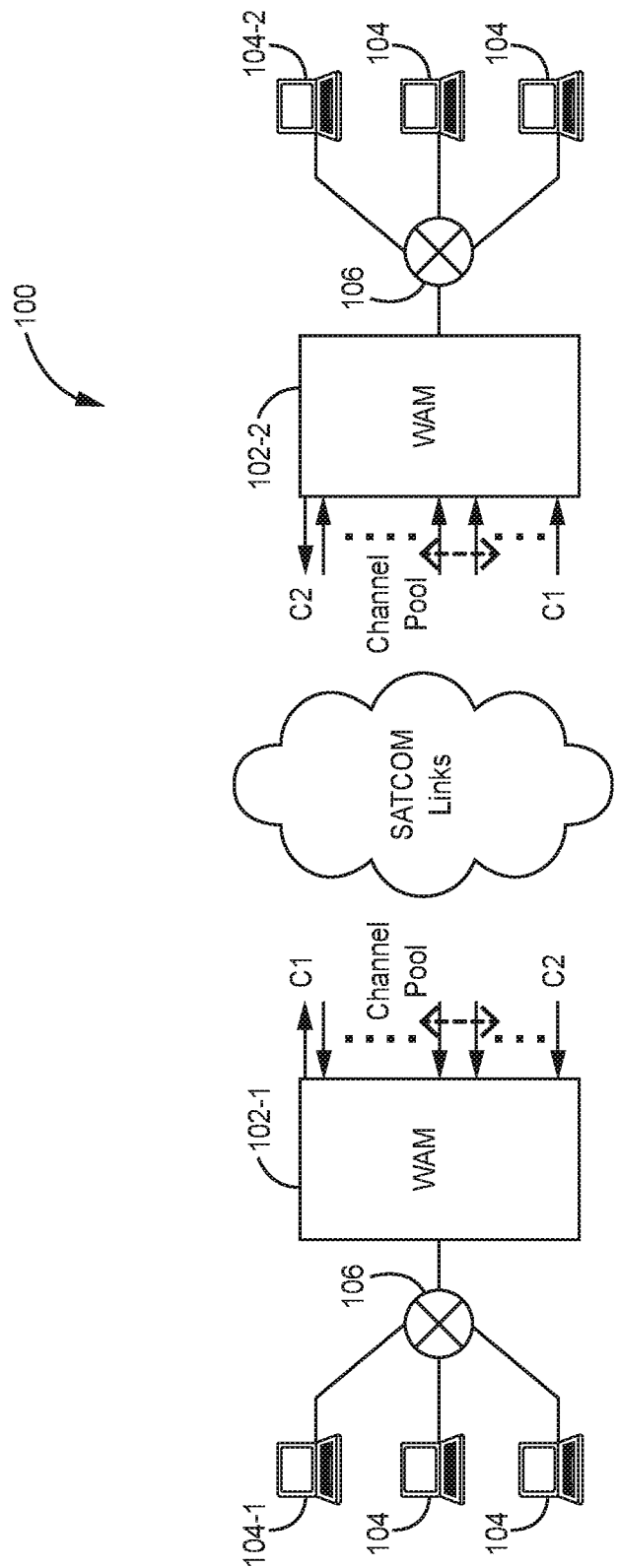
FIG. 1 is a block diagram of an example system in which more wideband anti-jam modems (WAMs) can communicate with one another directly than in prior systems.

FIG. 1 is a block diagram of an example system 100 in which significantly more WAMs than the number of receivers of each WAM are able to communicate with one another. System 100 includes a plurality of WAMS 102 that transmit and receive signals with one another over respective SATCOM links. Each WAM 102 is communicatively coupled to one or more endpoint devices 104 "behind" that WAM 102. In an example, the one or more endpoint devices 104 form part of an internet protocol (IP) network, such as a local area network (LAN), and are assigned one or more subnet addresses according to IP protocol. As used herein an endpoint device 104 or subnet is "behind" a WAM 102 if the WAM is communicatively disposed between the endpoint device 104 or subnet and the SATCOM links.

Each of the plurality of endpoint devices 104 can be communicatively coupled to a respective WAM 102 over one or more respective wired and/or wireless network links. Each endpoint device 104 can be a device capable of generating and receiving original IP packets for communication with another endpoint device 104 over an IP network. Example endpoint devices 104 include a personal computing device (e.g., a desktop computer, laptop computer, mobile device), IP phone, server, industrial equipment, sensor, encryption device, and a networking device generating or receiving original IP packets. Zero, one, or more than one endpoint device 104 can be behind each WAM 102.

Via the signals transmitted and received by the plurality of WAMs 102, the WAMs 102 forward packets to/from endpoint devices 104 therebehind. Thus, the endpoint devices 104 behind different WAMs 102 can communicate packets (e.g., IP packets) between one another via their corresponding WAMs 102 and their SATCOM links. For example, a first endpoint device 104-1 behind a first WAM 102-1 can generate a packet for a second endpoint device 104-2 behind a second WAM 102-2. The first endpoint device 104-1 can send the packet to the first WAM 102-1. The first WAM 102-1 can transmit a signal corresponding to the packet from the first endpoint device 104-1. The signal can be transmitted by the first WAM 102-1 over a SATCOM link to the second WAM 102-2. The second WAM 102-2 can receive the signal and decode the signal to obtain the packet generated by the first endpoint device 104-1. The second WAM 102-2 can then send the packet to the second endpoint device 104-2. In this way, the WAMs 102 can communicatively couple the endpoint devices 104 together in the system 100. One or more networking devices 106 (e.g., routers) can be communicatively disposed between the endpoint device(s) 104 and their respective WAM 102.

Each WAM 102 includes a transmitter and one or more receivers (e.g., 48 receivers). Each WAM 102 of the system 100 is assigned a transmit channel, and each WAM's 102 transmit channel is distinct from each other WAM's 102 transmit channel. The transmitter of each WAM 102 is fixed to transmit on its assigned transmit channel. That is, each WAM 102 transmits on its assigned transmit channel at all times.

Figure 2:
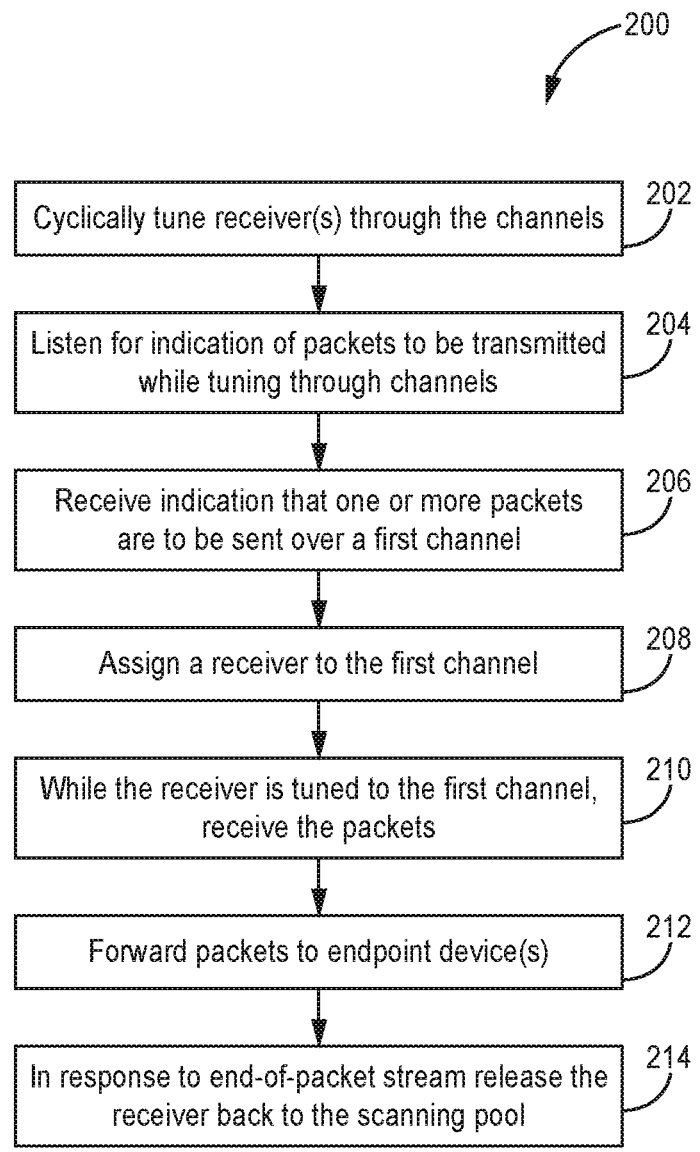
FIG. 2 is a flow diagram of an example method of dynamic receiver tuning for a WAM which enables more WAMs to communicate with one another directly.

FIG. 2 is a flow diagram of an example method of dynamically tuning the receiver(s) of a WAM to channels of the system 100. The receiver(s) of each WAM 102 are set to cyclically tune through the assigned transmit channels, scanning for messages from other WAM's 102 of the system 100 (block 202). The receiver(s) of each WAM 102 scan through all the assigned transmit channels, excluding the transmit channel assigned to the transmitter of that WAM 102. Thus, for example, if the system has 97 channels, the receivers for a first WAM 102-1 would scan through 96 of the channels—all channels except the channel assigned as the transmit channel for the first WAM 102-1.

The receiver(s) can scan through the transmit channels in any suitable manner. For example, the receiver(s) can first be tuned to a first subset of the transmit channels and then tuned to a second subset of the transmit channels, wherein the second subset does not include any channels from the first subset. An implementation of such an example includes tuning each of the 48 receivers to a different one of the transmit channels. This is the first subset of channels. Next, each of the 48 receivers are tuned to a different one of a second subset of transmit channels. This would enable the WAM 102 to scan through 96 channels with its receivers. Tuning to more than two subsets can also be performed, in order to further increase the number of channels scanned.

While the receivers of a WAM 102 are scanning through the transmit channels, the WAM 102 is listening for an indication on those channels that one or more packets for an endpoint device 104 behind the WAM 102 are to be sent to the WAM 102 (block 204). In an example, the indication is a channel request message from another WAM 102. Each WAM 102 can be configured to transmit a channel request message on its assigned transmit channel in order to transmit one or more packets for an endpoint device 104 to the WAM 102 in front of that endpoint device 104. For example, the second WAM 102-2 can receive an indication that the endpoint device 104-2 behind the second WAM 102-2 has one or more packets to send to the first endpoint device 104-1 behind the first WAM 102-1. In response to receiving the indication that there are one or more packets to send to the first WAM 102-1, the second WAM 102-2 can send a channel request message on its transmit channel to the first WAM 102-1. The second WAM 102-2 can send the channel request message over its transmit channel repeatedly until a reply is received from the first WAM 102-1. In an example, repeatedly sending can include periodically sending the channel request message. As the first WAM 102-1 is scanning through the channels with its receivers, the first WAM 102-1 will be tuned to the transmit channel of the second WAM 102-2 during a period in which a channel request message is being sent. When this happens, the first WAM 102-1 will receive the channel request message from the second WAM 102-2.

Since all WAMs 102 in the system 100 can receive the channel request messages from another WAM 102 (e.g., the second WAM 102-2), the channel request messages can include an indication of which WAM(s) 102 the channel request message is for. In an example, the indication of the WAM(s) 102 that the channel request message is for can be an identifier for the WAM(s) 102. In another example, the indication of the WAM(s) 102 that the channel request message is for can be the endpoint device(s) 104 or subnet(s) for which the corresponding packets are intended. In such an example, each WAM 102 can determine whether or not the channel request message is for that WAM 102 by comparing the one or more endpoint devices 104 or subnet(s) in the channel request message with a list of endpoint devices 104 or subnet(s) behind that WAM 102. A channel request message can be for one or more than one WAM 102 depending on which endpoint devices 102 or subnets the corresponding packets are for. In an example, the channel request message can be a broadcast request intended for all WAMs and can include a suitable indicator for such a broadcast message.

In any case, while scanning its receiver(s) through the channels, a WAM 102 can receive an indication that one or more packets are to be sent to the WAM 102 over a given channel (block 206). In response to receiving such an indication, the WAM 102 can assign one of its receivers to the channel over which the packets will be sent (block 208). By assigning one of its receivers to the channel, that receiver is taken out of the scanning pool and is tuned to the assigned channel to receive the one or more packets over that channel. That is, the WAM halts that receiver from cyclically tuning and instead tunes that receiver to the assigned channel for a period of time in order to receive the packets on that channel. The receiver remains tuned to the assigned channel until all of the one or more packets which prompted the channel request message (or other indication) are received. The end of the stream of one or more packets can be identified in any suitable manner including, for example, by receiving an "end-of-stream message" from the WAM 102 transmitting the one or more packets. In an example, the end of the stream can be identified by a lack of receiving any packets over the assigned channel for a threshold period of time. Once the receiver has received all the packets in the stream, the receiver can be released from the assigned channel, back into the scanning pool (block 214). By releasing the receiver from the assigned channel, the receiver re-enters the scanning pool and is used by the WAM 102 to scan through the channels with the other receivers once again.

As an example, in response to receiving the channel request message from the second WAM 102-1 on the second channel (which is assigned as the transmit channel for the second WAM 102-1), the first WAM 102-1 assigns a first receiver to the second channel. The first receiver halts cyclically tuning and tunes to the second channel to receiver the one or more packets. The first WAM 102-1 also transmits an acknowledgement of the channel request message over its assigned transmit channel (e.g., the first channel) to the second WAM 102-2. As the second WAM 102-2 is repeatedly transmitting the channel request message, the second WAM 102-1 can have one of its receivers tuned to the first channel awaiting an acknowledgement of the channel request message from the first WAM 102-1.

While a receiver of a WAM 102 is assigned to a channel, the receiver can receive the packets sent over the channel from the other WAM 102 (block 210). The WAM 102 can then forward the packets to the endpoint device(s) 102 or subnet(s) behind that WAM 102 (block 212). For example, while the first receiver of the first WAM 102-1 is assigned to the second channel, the first receiver can receive the one or more packets transmitted by the second WAM 102-2 over the second channel. The first WAM 102-1 can forward the one or more packets to one or more endpoint devices 104 or subnets behind the first WAM 102-1 in order to forward the one or more packets toward their destination(s).

Any number of the receiver(s) of a WAM 102 can be assigned to respective channels. Thus, if the first WAM 102-1 receives an indication that a second one or more packets is to be sent to the WAM 102-1 over a third channel, while a first receiver is assigned to a second channel, the first WAM 102-1 can assign a second receiver to the third channel to receive the second one or more packets. This can continue for additional receivers until all receivers are assigned to channels, at which point no more receivers are available to assign to a channel until one of the assigned receivers is released back into the scanning pool.

While the assigned receiver(s) of a WAM 102 are tuned to their respective assigned channel(s), any receivers not assigned to a channel remain in the scanning pool and cyclically tune through the channels, excluding the channel assigned to the transmitter of that WAM 102 and any channels assigned to a receiver of that WAM 102.

Using the methods described herein, a plurality of WAMs 102 can communicate over more channels than there are receivers for a given WAM. Thus, while prior systems were limited to, for example, 49 WAMs per COI, the methods described herein enable more than 49 WAMs 102 to be able to communicate with one another directly. Accordingly, efficiencies in communication can be achieved using the methods described herein for endpoint devices 104 behind the WAMs 102 in the system 100.

In an example, system 100 is a system as described in U.S. patent application Ser. No. 16/249,287, titled "IP PACKET TRANSLATION TO PIGGYBACK NETWORKING INFORMATION", filed on even date herewith, which is hereby incorporated herein by reference. In such an example, the one or more packets transmitted between the WAMs 102 conform to a proprietary protocol (referred to in the application Ser. No. 16/249,287 as the ZOOM protocol). The WAMs 102 translate between IP packets communicated with the endpoint devices 104 or subnet(s) and the ZOOM protocol to send information indicative of the one or more IP packets across the SATCOM links. In such an example, the channel request message and acknowledge of channel request message are networking information that can be included in a ZOOM packet sent according to the ZOOM protocol.

Figure 3:
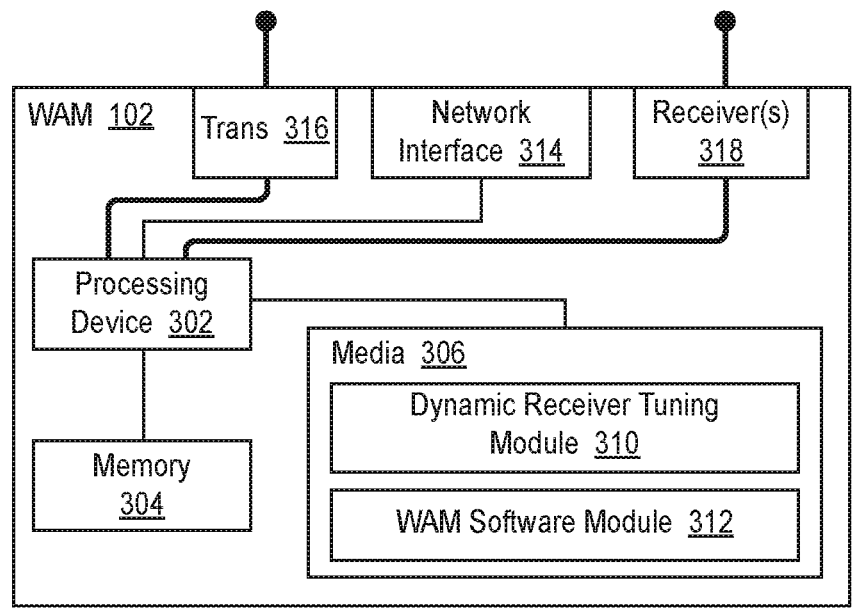
FIG. 3 is a block diagram of an example WAM.

FIG. 3 is a block diagram of an example WAM 102. Each WAM 102 includes a WAM software module 312 stored on a storage medium 406 of the WAM 102. The WAM software module 312 is software including instructions to implement the functionality of a WAM 102 described herein. The WAM software module 312 can include instructions which, when executed by one or more processing devices 302 of the WAM 102, perform functionality of a WAM 102 described herein. In this example, the WAM 102 also includes a dynamic receiver tuning module 310 stored on the storage medium 306. The dynamic receiver tuning module 310 is software including instructions which, when executed by the one or more processing devices 302 of the WAM 102, cause the WAM 102 to perform the dynamic receiver tuning functionality described herein. In an example, the dynamic receiving tuning module 310 can interact with one or more application programming interfaces (APIs) of the WAM module 312 to obtain information and control aspects of the WAM module 312, such as controlling receiver tuning and receiving messages from other WAMs 102 (e.g., channel request messages, acknowledgements). The dynamic receiver tuning module 310 can be a software module that is loaded onto a hardware device at the factory during manufacture of the WAM 102 or can be an add-on software module that is loaded onto a commercial off-the-shelf (COTS) device (e.g., WAM) in the field.

The one or more processing devices 302 can execute the instructions of the dynamic receiver tuning software module 310 and the WAM module 312. The one or more processing devices 302 can include a general-purpose processor or a special purpose processor. The instructions of the dynamic receiver tuning module 310 and WAM module 312 are stored (or otherwise embodied) on or in an appropriate storage medium or media 306 (such as a flash or other non-volatile memory) from which the instructions are readable by the processing device(s) 302 for execution thereby. The WAM 102 also includes memory 304 that is coupled to the processing device(s) 302 for storing instructions (and related data) during execution by the processing device(s) 302. Memory 304 comprises, in one implementation, any suitable form or random-access memory (RAM) now known or later developed, such as dynamic random-access memory (DRAM). In other implementations, other types of memory are used.

The WAM 102 also includes one or more network interfaces 314 for communicating with devices therebehind, a transmitter 316 for transmitting over a SATCOM link (channel) to other WAMs 102 and one or more receivers 318 for receiving over one or more SATCOM links (channels) from other WAMs 102. The one or more network interfaces 314, transmitter 316, and receiver(s) 318 can be coupled to the one or more processing devices 302. The one or more network interfaces 314 can include wired and/or wireless interfaces such as an Ethernet interface, an IEEE 802.11 transceiver, or other interface.

Figure 4:
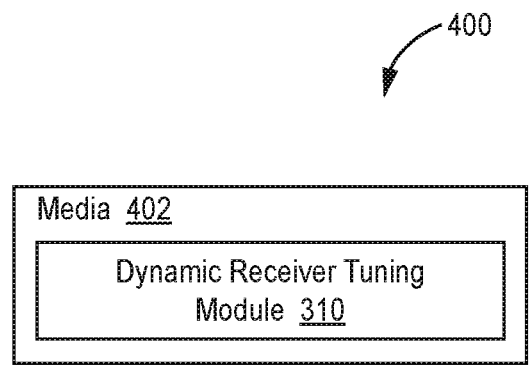
FIG. 4 is a block diagram of an example program product including a dynamic receiver tuning software module for a WAM.

FIG. 4 is a block diagram of an example software product dynamic receiver tuning module 400. The software product 400 includes a computer readable medium 402 including a dynamic receiver tuning software module 310 that can be loaded onto an appropriate hardware device. The dynamic receiver tuning module 310 includes instructions that are stored or other embodied on the computer readable medium 402 that is distinct from any processing device(s), memory, or other associated hardware for executing those instructions. The dynamic receiver tuning module 310 instructions can be loaded onto an appropriate hardware device, such as the WAM 102 shown in FIG. 3, for the hardware device to execute the instructions and perform the functionality (or a portion thereof) of a WAM 102 described herein. The computer readable medium 402 on which the dynamic receiver tuning module 310 is stored can be any suitable computer readable media, such as a magnetic media such as a hard disk drive (HDD), optical media such as a CD, DVD, Blu-Ray disk, or a non-volatile electric media such as a solid-state drive (SDD), flash media, or EEPROM. Such computer readable media can be standalone media (e.g., a USB stick or CD) or can be computer readable media within a computing device (e.g., a server or network accessible storage).

Figure 5A:
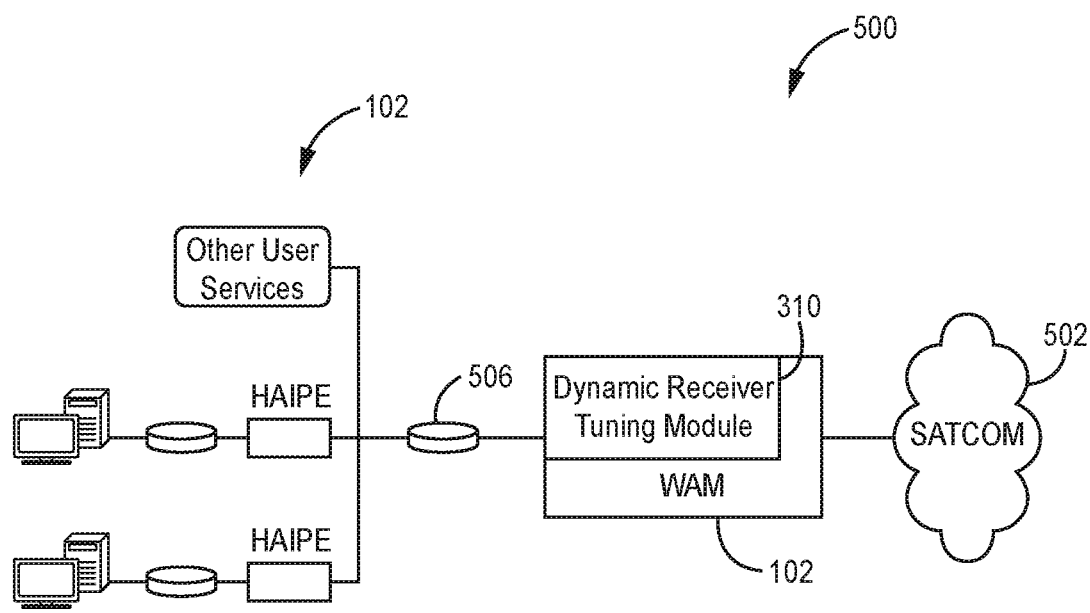
FIG. 5A is a block diagram of an example system in which a dynamic receiver tuning software module is loaded onto a WAM.

FIG. 5A is a block diagram of an example system 500 in which a dynamic receiver tuning software module 310 is embedded into a commercial off-the-shelf (COTS) WAM 102, causing the WAM device to perform the functionality of described herein. System 500 also includes, SATCOM links 502 and the WAM 102 operates in accordance with a WAM direct sequence spread spectrum (DSSS) mode specification (e.g., version 0.8 or version 2.0) promulgated by the United States Navy. The WAM 102 has the dynamic receiver tuning software module 310 loaded thereon which, when executed by processing device(s) of the WAM 102, causes the WAM 102 to perform the functions described herein. The WAM 102 can also perform the regular functions of a WAM, which includes communicating in accordance with the DSSS specification. The dynamic receiver tuning module 310 can interact with (e.g., APIs) of a WAM software module running on the WAM 102 to cause the WAM 102 to perform the actions described herein. The system 500 can also include a router (e.g., ADNS router) 506 and a plurality of endpoint devices 102 communicatively disposed behind the WAM 102.

Figure 5B:
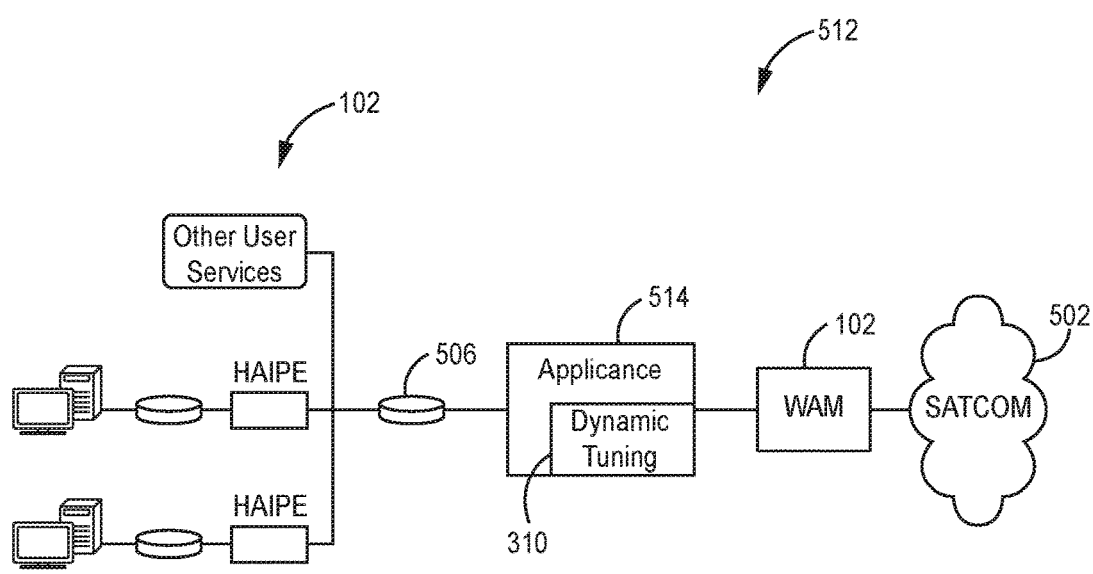
FIG. 5B is a block diagram of an example system in which a dynamic receiver tuning software module is loaded onto a stand-alone hardware appliance that communicates with a WAM over a network interface.

FIG. 5B is a block diagram of an example system 512 including a stand-alone hardware appliance 514 that executes the dynamic receiver tuning software module 310. The stand-alone hardware appliance 514 can include the dynamic receiver tuning software module 310 loaded onto media therein. The hardware appliance 514 can include a network interface (e.g., Ethernet interface) to send and receive packets with a WAM 102. The hardware appliance 514 can also include one or more other network interfaces (e.g., Ethernet and/or Wi-Fi interfaces) for sending and receiving packets with endpoint devices 104 and/or subnet(s) behind the appliance 514.

The dynamic receiver tuning software module 310 can cause the appliance 514 to send packets (or other messages) over the network interface to the WAM 102, wherein the packets instruct or otherwise cause the WAM 102 to perform the functions of a WAM described herein. The WAM 102 can be disposed in front of the stand-alone appliance 514 for sending and receiving signals over SATCOM links 502. The system 512 can also include a router (e.g., ADNS router) 506 and a plurality of endpoint devices 104 communicatively disposed behind the stand-alone appliance 514.

What is claimed is:

1. A method of dynamically tuning receivers of a wideband anti-jam modem (WAM), the method comprising:
   providing one or more receivers and a transmitter on a first WAM of a plurality of WAMs;
   providing a plurality of channels for transmission and reception of signals for the plurality of WAMs, wherein each of the one or more receivers is tunable to receive a single channel of the plurality of channels at a time, wherein the transmitter is fixed to transmit on a first channel of the plurality of channels, wherein the plurality of channels includes more channels than there are receivers in the one or more receivers;

cyclically tuning the one or more receivers through the plurality of channels except the first channel;

while cyclically tuning the one or more receivers, receiving an indication that one or more packets to an endpoint device behind the first WAM are to be sent to the first WAM on a second channel of the plurality of channels;

in response to receiving the indication, halting the cyclical tuning for a first receiver of the plurality of receivers and tuning the first receiver to the second channel for a first period of time to receive the one or more messages; and after the first period of time, cyclically tuning the first receiver along with any other receivers of the one or more receivers through the plurality of channels except the first channel.

2. The method of claim 1, comprising:
in response to receiving the indication, transmitting an acknowledgment of the indication over the first channel.

3. The method of claim 1, wherein the indication that one or more packets are to be sent is a channel request message.

4. The method of claim 1, comprising:
in response to each indication that one or more packets for endpoint devices behind the first WAM are to be sent to the first WAM over a respective channel of the plurality of channels, assigning a respective receiver to the respective channel for a period of time to receive the one or more packets, wherein assigning a respective receiver includes halting cyclical tuning for the respective receiver and tuning the respective receiver to the respective channel;

wherein cyclically tuning includes cyclically tuning receivers of the one or more receivers while those receivers are not assigned to a channel.

5. The method of claim 4, wherein cyclically tuning includes cyclically tuning receivers to channels, excluding channels that are assigned to a transmitter of the first WAM and channels that are assigned to a receiver of the first WAM.

6. The method of claim 1, wherein cyclically tuning the one or more receivers includes:
tuning the one or more receivers to a first subset of the plurality of channels excluding the first channel; and
then tuning the plurality of receivers to a second subset of the plurality of channels, wherein the second subset does not include any channels from the first subset.

7. The method of claim 1, comprising:
transmitting a channel request message over the first channel to a second WAM in response to an indication that one or more packets from an endpoint device behind the first WAM are to be transmitted from the first WAM to the second WAM;
receiving an acknowledgement of the channel request message from the second WAM on a third channel;
in response to receiving the acknowledgement, transmitting the one or more messages over the first channel to the second WAM.

8. The method of claim 1, wherein the plurality of WAMs operate in accordance with a WAM direct sequence spread spectrum (DSSS) mode specification promulgated by the United States Navy.

9. The method of claim 1, wherein the one or more receivers consist of 48 receivers, wherein the plurality of channels include at least 98 channels.

10. A method of dynamically tuning receivers among a plurality of wideband anti-jam modems (WAM), the method comprising:
providing one or more receivers and a transmitter on each of the plurality of WAMs;
providing a plurality of channels for transmission and reception of signals for the plurality of WAMs, wherein each of the one or more receivers of each of the plurality of WAMs is tunable to receive a single channel of the plurality of channels at a time, wherein the transmitter of each of the plurality of WAMs is fixed to transmit on a single channel of the plurality of channels, wherein each WAM's transmitter is fixed to transmit on a different single channel than each other WAM's transmitter, wherein the plurality of channels includes more channels than there are receivers in the one or more receivers of any single WAM of the plurality of WAMs;
cyclically tuning the one or more receivers of each WAM through the plurality of channels except the single channel to which the transmitter of that WAM is fixed;
each WAM of the plurality of WAMS transmitting a channel request message over the single channel to which that WAM's transmitter is fixed in response to receiving an indication that one or more packets from an endpoint device behind that WAM are to be transmitted from that WAM;
while cyclically tuning the one or more receivers, each WAM of the plurality of WAMs listening for indications on the plurality of channels that one or more packets are to be sent to an endpoint device behind that WAM on a respective channel of the plurality of channels;
each WAM of the plurality of WAMs, in response to an indication that one or more packets are to be sent to an endpoint device behind that WAM, assigning a respective receiver of the WAM to the respective channel over which the one or more packets are to be sent for a period of time to receive the one or more packets, wherein assigning a respective receiver includes halting cyclical tuning for the respective receiver and tuning the respective receiver to the respective channel;
wherein cyclically tuning includes each WAM of the plurality of WAMs cyclically tuning receivers of the one or more receivers while those receivers are not assigned to a channel.

11. The method of claim 10, wherein each WAM of the plurality of WAMs has the same number of receivers, wherein there are at least two more WAMs in the plurality of WAMs and at least two more channels in the plurality of channels than there are receivers on a single WAM of the plurality of WAMs.

12. The method of claim 10, comprising:
each WAM of the plurality of WAMs, in response to receiving an indication on a channel that one or more packets is to be sent to that WAM, transmitting an acknowledgment of the indication over the channel on which the indication was received.

13. The method of claim 12, wherein the indication that one or more packets are to be sent is a channel request message.

14. The method of claim 10, comprising:
each WAM of the plurality of WAMs, in response to each indication that one or more packets for endpoint devices behind another WAM are to be sent to that WAM over a respective channel of the plurality of channels, assigning a respective receiver to the respective channel for a period of time to receive the one or more packets, wherein assigning a respective receiver includes halting cyclical tuning for the respective receiver and tuning the respective receiver to the respective channel;

wherein cyclically tuning includes cyclically tuning receivers of the one or more receivers while those receivers are not assigned to a channel.

15. The method of claim 10, wherein cyclically tuning includes cyclically tuning receivers to channels, excluding channels that are assigned to a transmitter of the respective WAM and channels that are assigned to a receiver of the respective WAM.

16. The method of claim 10, wherein cyclically tuning the one or more receivers includes:

tuning the one or more receivers to a first subset of the plurality of channels excluding the first channel; and then tuning the plurality of receivers to a second subset of the plurality of channels, wherein the second subset does not include any channels from the first subset.

17. The method of claim 10, wherein the plurality of WAMs operate in accordance with a WAM direct sequence spread spectrum (DSSS) mode specification promulgated by the United States Navy.

18. The method of claim 10, wherein the one or more receivers consist of 48 receivers, wherein the plurality of channels include at least 98 channels.

19. A program product for a wideband anti-jam modem (WAM) including one or more receivers and a transmitter on a first WAM of a plurality of WAMs, wherein a plurality of channels are provided for transmission and reception of signals for a plurality of WAMs, wherein each of the one or more receivers is tunable to receive a single channel of the plurality of channels at a time, wherein the transmitter is fixed to transmit on a first channel of the plurality of channels, wherein the plurality of channels includes more channels than there are receivers in the one or more receivers, the program product comprising:

a non-transitory processor readable medium having software stored thereon, the software, when executed by one or more processing devices of a WAM, configured to:

cyclically tune the one or more receivers through the plurality of channels except the first channel;

receive an indication, while cyclically tuning the one or more receivers, that one or more packets to an endpoint device behind the first WAM are to be sent to the first WAM on a second channel of the plurality of channels;

in response to receiving the indication, halt the cyclical tuning for a first receiver of the plurality of receivers and tuning the first receiver to the second channel for a first period of time to receive the one or more messages; and after the first period of time, cyclically tune the first receiver along with any other receivers of the one or more receivers through the plurality of channels except the first channel.

20. The program product of claim 19, wherein the WAM operates in accordance with a WAM direct sequence spread spectrum (DSSS) mode specification promulgated by the United States Navy.

* * * * *